United States Patent [19]
Hayashida et al.

[11] Patent Number: 5,926,118
[45] Date of Patent: *Jul. 20, 1999

[54] VEHICULAR NAVIGATION APPARATUS

[75] Inventors: Kihachi Hayashida, Anjo; Takeshi Yanagikubo, Nishio, both of Japan

[73] Assignee: Aisin AW Co., Ltd., Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/673,231

[22] Filed: Jun. 27, 1996

[30] Foreign Application Priority Data

Jun. 28, 1995 [JP] Japan ..................................... 7-161679

[51] Int. Cl.$^6$ .................................................. G08G 1/123
[52] U.S. Cl. ........................................... 340/995; 701/209
[58] Field of Search ..................................... 340/995, 988, 340/990; 364/449.3, 449.4, 449.5; 701/209, 210, 208

[56] References Cited

U.S. PATENT DOCUMENTS

| 5,262,775 | 11/1993 | Tamai et al. | 364/449.4 |
|---|---|---|---|
| 5,291,413 | 3/1994 | Tamai et al. | 364/449.4 |
| 5,291,414 | 3/1994 | Tamai et al. | 340/995 |
| 5,303,159 | 4/1994 | Tamai et al. | 340/995 |
| 5,369,588 | 11/1994 | Hayami et al. | 340/995 |
| 5,371,497 | 12/1994 | Nimura et al. | 364/449.5 |
| 5,450,343 | 9/1995 | Yurimoto et al. | 340/995 |
| 5,486,822 | 1/1996 | Tenmoku et al. | 340/995 |
| 5,543,789 | 8/1996 | Behr et al. | 340/995 |
| 5,550,538 | 8/1996 | Fujii et al. | 340/995 |
| 5,659,476 | 8/1997 | LeFebvre et al. | 364/449.4 |

Primary Examiner—Brent A. Swarthout
Attorney, Agent, or Firm—George A. Loud; Lorusso & Loud

[57] ABSTRACT

A navigation apparatus has: a current position detecting device for detecting current position of a vehicle in which the device is installed; an information storing device for storing map information and other route information for route search and route guidance; an input device for inputting instructions; an output device for outputting information for route guidance; and a central processing unit. The central processing unit has a route searching capability for searching for a route from the current position to a destination or an intermediate point on the basis of the map information, route storage means for temporarily storing the route found by the route search, and route guidance control for outputting to the output device a signal for executing route guidance. The apparatus determines a location on the road located a predetermined distance ahead in the direction of travel from the current position, as a search starting location or as a route guidance starting location.

11 Claims, 13 Drawing Sheets

Fig.10

| VEHICLE SPEED | ROAD TYPE | DISTANCE |
|---|---|---|
| 0Km/h OR HIGHER, BUT LESS THAN 30Km/h | SUPERHIGHWAY | 1000m |
| | NATIONAL ROAD | 200m |
| | ORDINARY ROAD | 150m |
| 30Km/h OR HIGHER, BUT LESS THAN 50Km/h | SUPERHIGHWAY | 1000m |
| | NATIONAL ROAD | 300m |
| | ORDINARY ROAD | 200m |
| 50Km/h OR HIGHER, BUT LESS THAN 80Km/h | SUPERHIGHWAY | 1000m |
| | NATIONAL ROAD | 400m |
| | ORDINARY ROAD | 250m |
| 80Km/h OR HIGHER, BUT LESS THAN 110Km/h | SUPERHIGHWAY | 1000m |
| | NATIONAL ROAD | 500m |
| | ORDINARY ROAD | 300m |
| 110Km/h OR HIGHER, BUT LESS THAN 140Km/h | SUPERHIGHWAY | 1000m |
| | NATIONAL ROAD | 600m |
| | ORDINARY ROAD | 400m |

VEHICULAR NAVIGATION APPARATUS

BACKGROUND OF THE INVENTION

1. Field of the Invention

The present invention relates to a vehicular navigation apparatus that performs route guidance along a route found and set between a current position and a destination or an intermediate point.

2. Description of the Related Art

Vehicular navigation apparatuses are designed to search for a route from a current position to a destination or the like on the basis of an inputted location such as a destination or the like, and perform route guidance based on the route found by the search, thereby reducing the difficulties that a driver faces when driving on roads unfamiliar to the driver. For this end, a typical vehicular navigation apparatus has a function for searching for a route from a current position to a destination upon input of the destination, and functions to display a guiding route found by the search and the current position of the vehicle. With these functions, the vehicular navigation apparatus detects the current vehicle position, and displays the current vehicle position on a the route found by search, in order to provide route guidance.

While being guided along a route found by the search, a driver may deviate from the route for some reason, for example, the driver's misperception of a target object or a misunderstanding. To cope with such a deviation from the route, Japanese patent laid-open application No. SHO 61-38518, for example, proposes a vehicular navigation apparatus which determines that a vehicle has deviated from the set route if the current position of the vehicle is apart from the route by a predetermined distance or greater, and then performs a search again to find a route from an intersection located ahead of the vehicle current position to the destination.

Considering the time required to re-find a guiding route from the current position to the destination after detection of a deviation from route, however, it is possible that the above-described type of apparatus, that searches for a route from an intersection ahead of the vehicle, may find such a new route only after the vehicle has passed the intersection. If this should happen, the driver will have passed the intersection without knowing the direction which should have been taken at the intersection in accordance with the search results. Therefore, the driver may well go in a direction different from the direction indicated by the search results. In addition, the search results will not take into account the direction in which the vehicle is traveling after passing the intersection in the above-described manner. Thus, in such an event, the driver will likely go straight through the intersection, even if the driver should have turned there, for example, to the left, according to the new route to the destination determined by the search, and will learn of the search results only after passing the intersection.

Problems similar to those mentioned above may occur when the apparatus searches for a route to return to the previously set route after detecting deviation from that route. Since the time required to find a route from the currently detected position to the destination or back to the previously set route after detection of deviation therefrom is significant, it can happen that an optimal route connecting to an intersection is displayed only after the vehicle has traveled through that intersection in a direction different from the direction according to the optimal route. Thus, the starting point of a route displayed as a result of the search will not necessarily be ahead of the vehicle. Furthermore, even if a route is displayed such that a crucial point, for example, for turning right or left, is ahead of the vehicle, the vehicle may be coming so close to the point that the driver cannot react in sufficient time to execute the guidance instructions.

As for the above-described route re-search methods, the present applicant has proposed a search method that searches for a correcting route to return to the previously set route and connects the connecting route to the previously set route and a search method wherein the search may develop an entirely new route to the destination or an intermediate point (Japanese patent application laid-open No. HEI 6-68389). The present applicant has also proposed a route search method that searches for another guiding route based on the route set beforehand (Japanese patent application No. HEI 6-228174). However, these methods are not free from the above-mentioned problems. In addition, similar problems will obviously arise with an initial route search performed upon the initial input of a destination or an intermediate point if a vehicle has started to travel before the result of search is output in response to the route search instruction. In such a case, the vehicle will be traveling on a road off the set route by the time when the search results are output.

SUMMARY OF THE INVENTION

The present invention is intended to solve the above-mentioned problems. Accordingly, it is an object of the present invention to provide a vehicular navigation apparatus that is able to perform route guidance starting at an appropriate location according to the result of the initial search or re-search for an optimum route.

According to the present invention, there is provided a vehicular navigation apparatus for guidance along a preset route comprising: a current position detecting device for detecting the current position of the vehicle in which the device is installed; an information storing unit for storing map information and other route information for route search and route guidance; an input device for inputting at least one of a destination and an intermediate point and for inputting an instruction to search for a route to at least one of the destination and the intermediate point on the basis of the current position detected by the current position detecting device; an output device for outputting information for route guidance; and a central processing unit. The central processing unit has route searching means for performing an initial search for a route from the current position to at least one of the destination or the intermediate point, and a later re-search (second route search, i.e. a search of the area surrounding the current position, in response to the detection of deviation from the previously set route, and a search to determine a new entire route from the current position in response to the detection of deviation from the previously set route, etc.), on the basis of the map information. The central processing unit further has route storing means for temporarily storing the route found and set by the route searching means, and route guidance control means for outputting to the output device a signal for executing route guidance based on the set route. The route searching means detects the travel direction of the vehicle, and determines, as a new route starting location, a location on a road for which searchable data is stored in the information storing device and that is located a predetermined distance ahead in the direction of travel from the current position, and searches for a route from that location.

The term "intermediate point," as used herein, has reference to a driver designated location between the starting point and the destination or a point through which the driver wishes to pass in route to the destination.

In addition, when performing a new route search after a route has previously been stored in the route storing means, the route searching means may perform the route search on the basis of an instruction from the input means. Furthermore, the central processing unit may further comprise off-route detecting means for determining whether the current position, as detected by the current position detecting device, is off the set route, and the route searching means may perform another route search if the off-route detecting means detects deviation from the set route. If the vehicle is not traveling on a "guidance possible road", i.e. a road for which data stored in the information storing unit is available for searching, the route searching means may wait until the vehicle comes to travel on a road for which data is available, before searching for a route. Moreover, once the route searching means has performed a new route search, the route guidance control means may erase the previously found route from the route storing means and output a signal for executing route guidance based on the newly found route, provided the new route search has been completed and the vehicle has traveled a predetermined distance. As the route searching means is performing a new route search, the route guidance control means may provide predetermined navigation guidance until the new route search is completed.

Because the apparatus uses the route searching means to detect the travel direction of the vehicle and to determine, as a route search starting location, a location on a road for which data is stored in the information storing device and that is located a predetermined distance ahead in the direction of travel from the current position, the vehicular navigation apparatus of the present invention prevents any incident where guidance would be started from a location that the vehicle has already passed.

The navigation apparatus of the present invention is able to re-search for a new route either upon receipt of a driver's request or automatically, in response to detection of deviation from the route. Furthermore, since a new search by the route searching means prompts the route guidance control means to erase the previously found route from the route storing means and outputs a signal for executing route guidance based on the newly found route, subject to the route re-search having been completed and the vehicle having traveled a predetermined distance, the route guidance can be switched at appropriate timing to the guidance based on the new route found by the re-search. In addition, since while the route searching means is performing a new search the route guidance control means provides predetermined navigation guidance until the new route search ends, the present invention prevents a disagreement between the results of the new search and the current vehicle travel direction, even when the new starting location is set beyond the intersection ahead.

BRIEF DESCRIPTION OF THE DRAWINGS

The foregoing and further objects, features and advantages of the present invention will become apparent from the following description of preferred embodiments with reference to the accompanying drawings, wherein:

FIG. 10 is a table showing correlation of the vehicle speed, the type of road and the distance;

DETAILED DESCRIPTION OF PREFERRED EMBODIMENTS

Embodiments of the invention will now be described with reference to the accompanying drawings.

Figure 1:
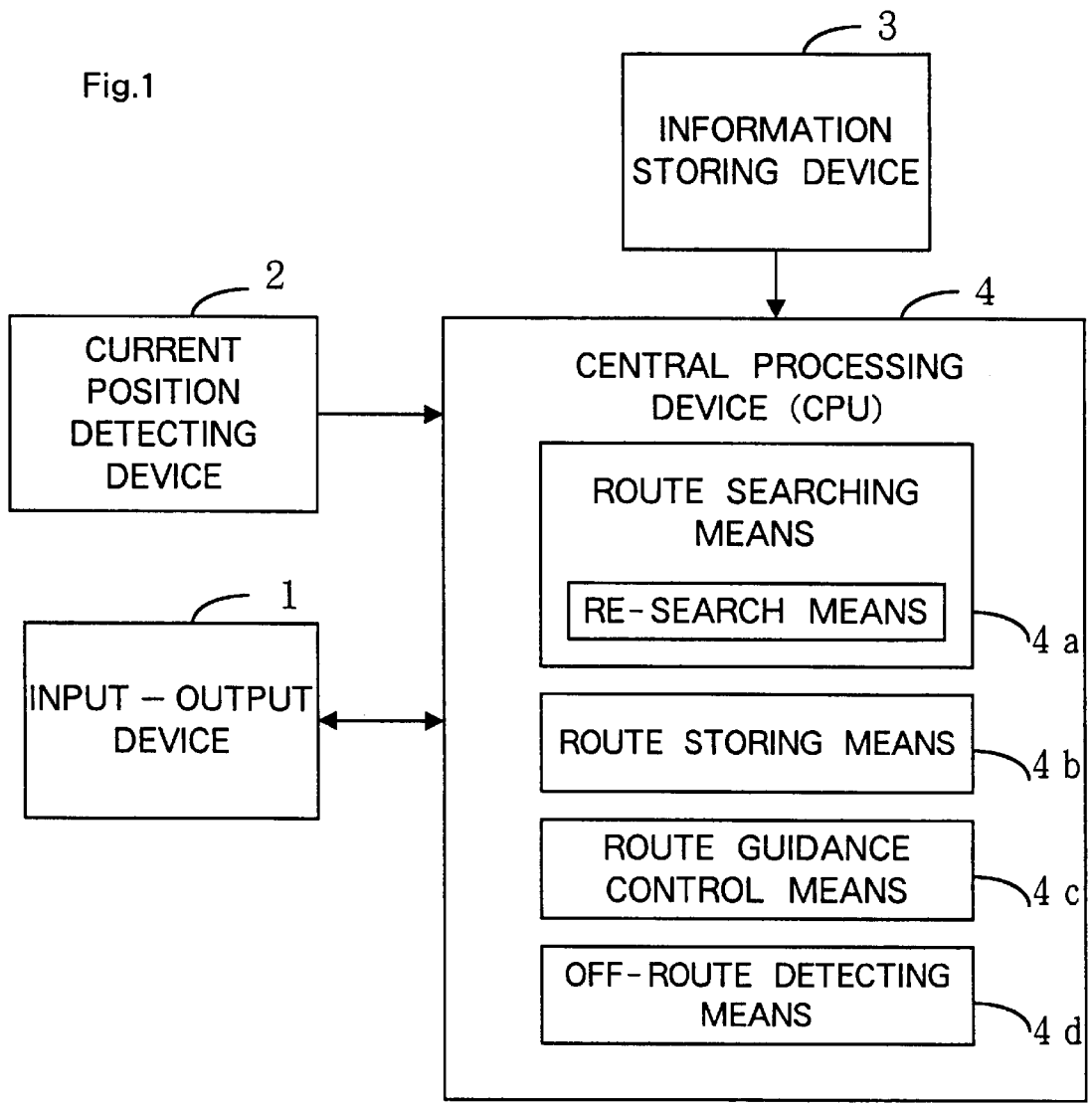
FIG. 1 is a block diagram of the basic construction of the vehicular navigation of the present invention.
Figure 2:
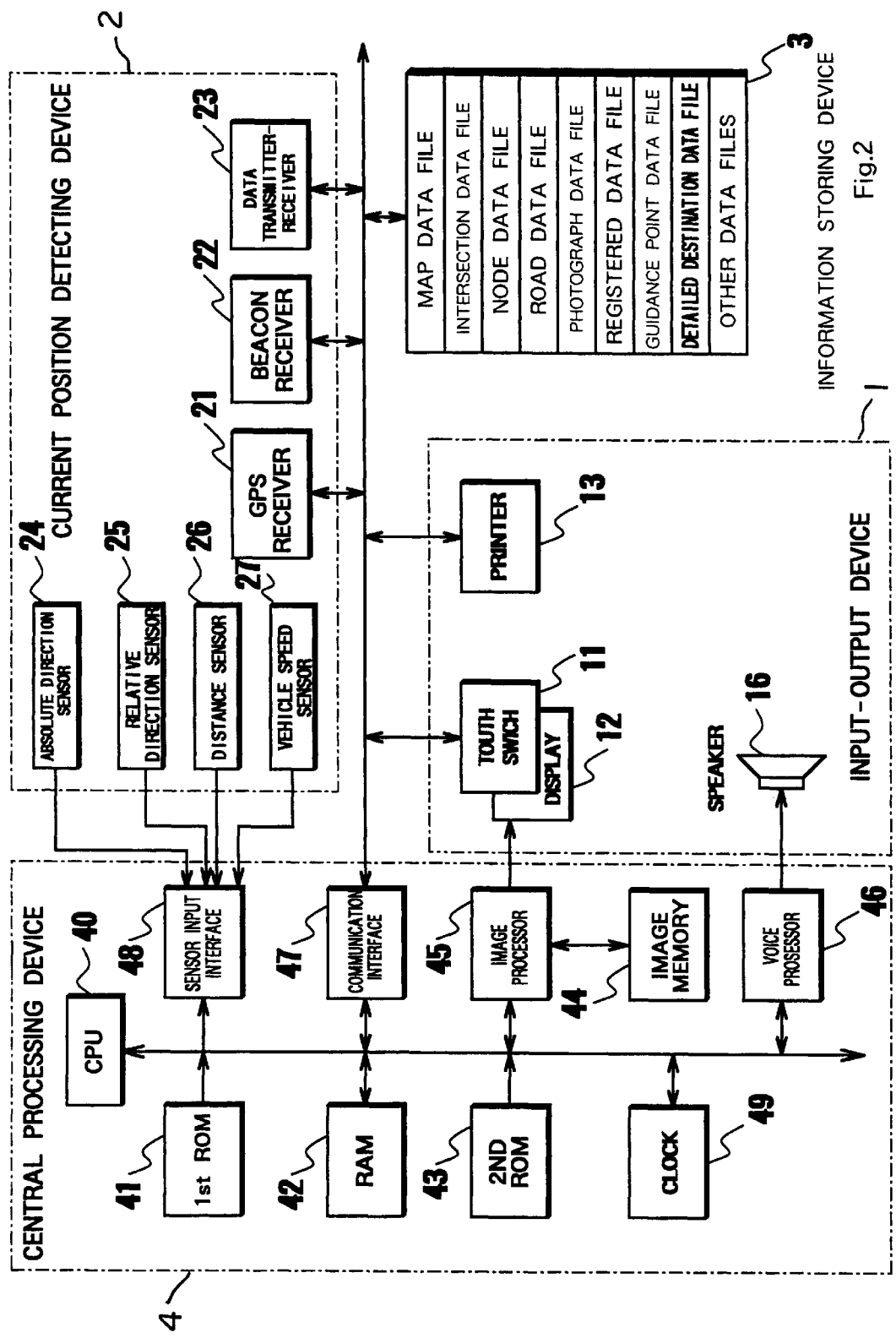
FIG. 2 is a block diagram of a first embodiment of the vehicular navigation apparatus of the present invention.

Referring to FIGS. 1, 2, a vehicular navigation apparatus according to the present invention comprises: an input-output device 1 for inputting and outputting information regarding route guidance, a current position detecting device 2 for detecting information regarding current position of the vehicle in which the apparatus is installed, an information storing device 3 for storing navigation data needed for computation to find a route, display guidance data needed for route guidance, etc., a central processing unit 4 for executing a route search operation, displaying guidance information needed for route guidance, and controlling the entire system. These components will now be individually described.

The input-output device 1 has functions for inputting a destination, and for instructing the central processing unit 4, responsive to a driver's input, to execute a navigation operation for output of guidance information by voice and/or on a screen, and for outputting to a printer the data so obtained. To realize these functions, the device 1 has in its input section touch switches 11 and other operating switches for inputting a destination by using a telephone number or coordinates on a map, and for requesting route guidance. The input section may be a remote control type. The output section has a display 12 for displaying inputted data and for displaying route guidance automatically, in response to a driver's request, a printer 13 for printing data processed by the central processing device 4 or data stored in the information storing device 3, and a loud speaker 16 for vocally outputting route guidance.

The display 12 is a color CRT or a color liquid crystal display. The display 12 displays all the color screens necessary for navigation, such as intersection picture screens, segment picture screens and route setting screens, based on guidance data and map data processed by the central processing unit 4, and also displays, in a main screen, buttons for setting route guidance and switching guidance or screens during route guidance. Information regarding an intersection that is being traveled through, such as the name of the intersection, is displayed in color in a segment picture screen in real time, in a pop-up fashion.

The display 12 is disposed in an instrument panel near the driver's seat, so that a driver can check the current position of the vehicle and obtain information on the route ahead by looking at a segment picture displayed. The display 12 has a touch switch panel 11 corresponding to the display of the function buttons, so that a signal is input by touching a button to execute the corresponding operation mentioned above. The input signal generating means, including the buttons and the touch switch panel, constitutes the input section.

The current position detecting device 2 comprises a GPS receiver 21 that uses a satellite navigation system (or GPS), a beacon receiver 22, a data transmitter-receiver 23 for receiving GPS correction signals using, for example, cellular phone or multiple FM signals, an absolute direction sensor 24 in the form of a geomagnetic sensor or the like, a relative direction sensor 25 in the form of a wheel sensor, a steering sensor, a gyroscope and the like, a distance sensor 26 for detecting travel distance on the basis of the number of rotations of a wheel, and a vehicle speed sensor 27 for detecting travel speed of the vehicle.

The information storing device 3 stores files of various data for route guidance including map data, intersection data, node data, road data, photograph data, registered point data, destination point data, guidance point data, detailed destination data, destination name pronunciation data, phone number data, etc. In other words, the information storing device 3 is a database storing all the data necessary for operation of the navigation apparatus.

The central processing unit 4 comprises: a CPU 40 for executing various computations; a first ROM 41 for storing programs for route search operations and the like, and programs and data for the display output control needed for route guidance display and the voice output control needed for vocal guidance; a RAM 42 for temporarily storing coordinates of point of a set destination, guidance information for a set route including road surface code Nos., and the like, and data currently in use; a second ROM 43 for storing display information data needed for map display and route guidance; an image memory 44 for storing image data to be used for displaying screens on the display; an image processor 45 for retrieving image data from the image memory 44 and for processing of the image data and outputting the processed data to the display on the basis of a display output control signal from the CPU 40; a voice processor 46 for synthesizing sounds, voices, phrases, sentences or the like retrieved from the information storing device 3, converting the synthesized products into analog signals, and outputting the signals to the speaker 16, on the basis of a voice output control signal from the CPU 40; a communication interface 47 for inputting and outputting data through communications; a sensor input interface 48 for receiving sensor signals from the current position detecting device 2; and a clock 49 for recording date or hours as internal diagnostic information. Route guidance can be displayed and/or vocally output, according to the driver's selection.

Figure 3:
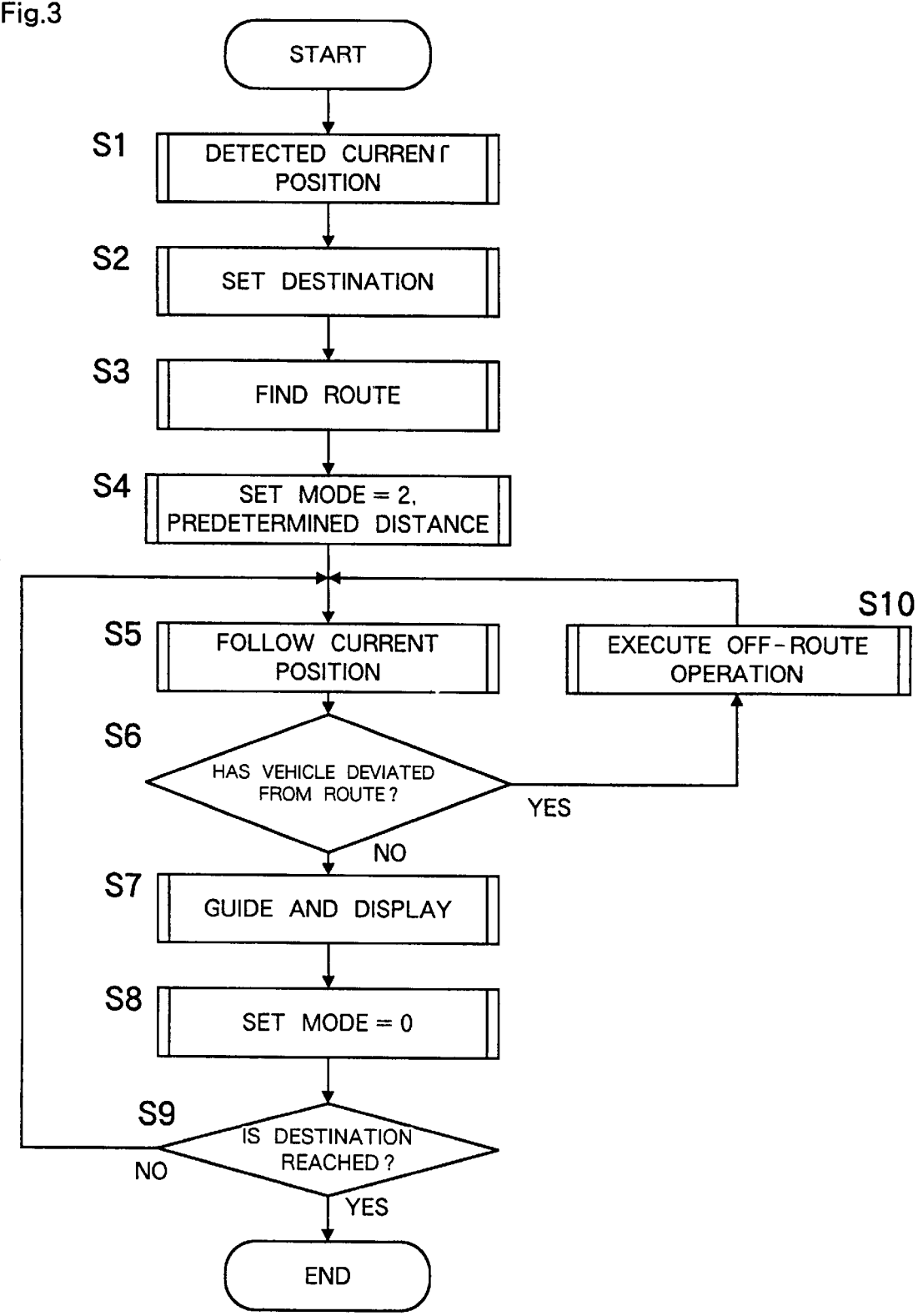
FIG. 3 is a flow chart of operation of the navigation apparatus in a mode providing a new route search automatically in response to detection of deviation from the set route.
Figure 4:
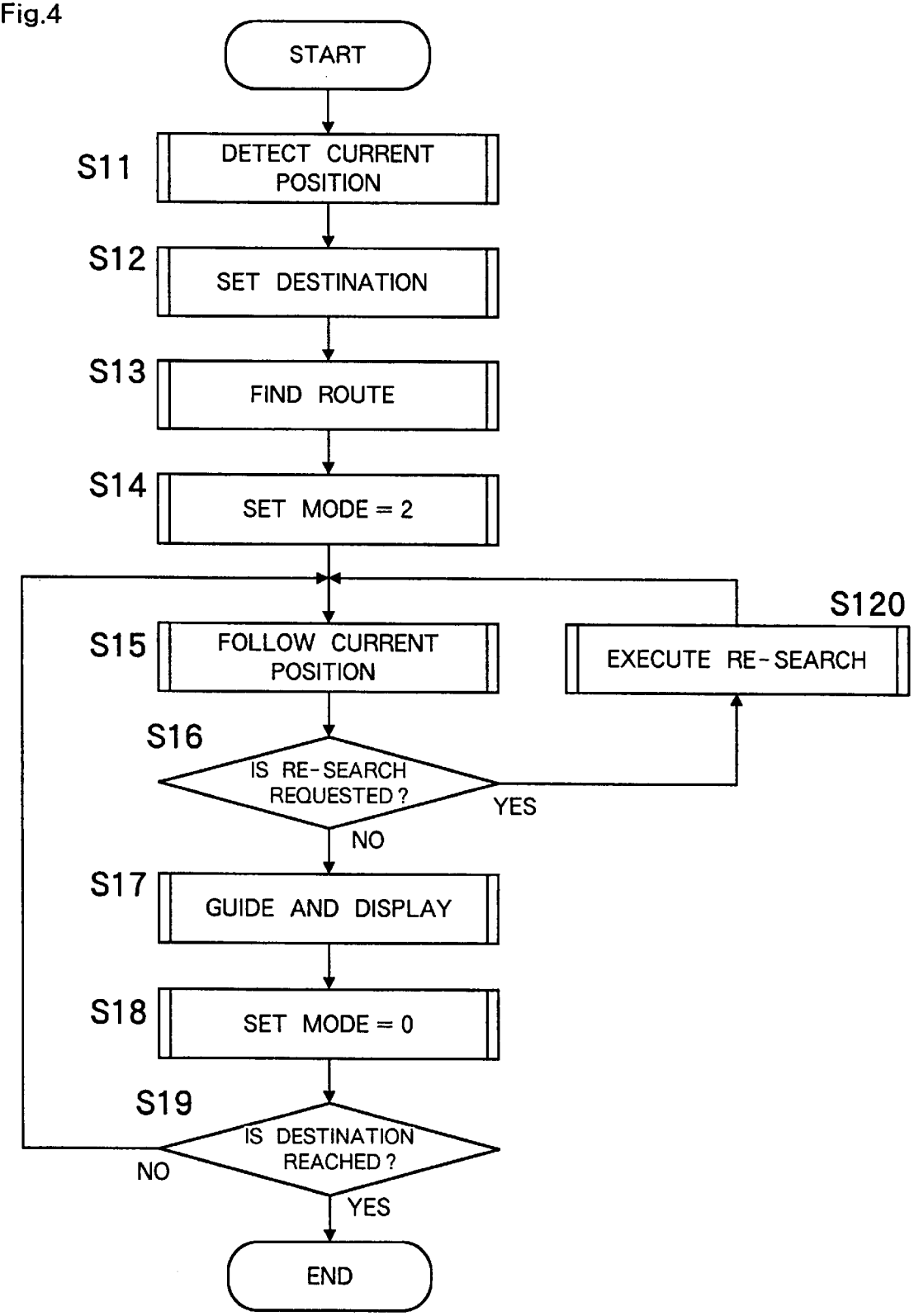
FIG. 4 is a flow chart of operation of the navigation apparatus in a mode providing a new route search in response to a request manually input by the driver.

FIG. 3 and FIG. 4 illustrate the operation of the overall system. The apparatus first determines a current position (departure point), which is needed for route search, by using the current position detecting device 2 (step S1). Then, a destination is set by inputting information setting the destination on a destination setting screen through the input device (step S2), and the route searching means searches for a route (step S3). A predetermined distance is set after the mode information MODE is set to "2" (step S4). The mode information MODE is set to "0" when the vehicle is on a route for which guidance data is available ("guidance possible road"), "1" when the vehicle is traveling on a road or through an area for which no guidance data is available (re-search will be started upon entering onto "a guidance possible road"), "2" when a search has been successfully completed, and "3" when a search has failed. The "guidance possible road" data is road data included in the map information stored in the information storing device 3 and, more specifically, road data available for route search and route guidance. According to this embodiment, roads having at least a predetermined width are designated as "guidance possible roads", and roads having less width are classified as narrow roads for which data cannot be used for route search or route guidance but, rather, can be used only for display. Alternatively, roads may be classified by road type instead of width. Further, road classification may be omitted and all the road data stored in the information storing device 3 may be designated as "guidance possible road" data. In practice, the vehicular navigation apparatus does not necessarily store in the information storing device 3 data for certain roads, e.g. data for back streets and private roads would not be stored. Therefore, if a driver leaves a "guidance possible road" and enters a road that is not registered in the information storing device 3, the apparatus cannot recognize the road corresponding to the current position and, thus, cannot perform route guidance or route search.

The above-mentioned predetermined distance is set for determination of deviation from route. That is, if the vehicle has traveled through the predetermined distance after leaving a set route, the apparatus determines that the vehicle has deviated from the route, and automatically starts a re-search for a new route.

When the route guidance along a set route is started by touching the guidance starting key of the input device, the current position detecting means determines the position of the vehicle and continues detecting the current position (step S5). Subsequently, the distance between the current position and the set route is determined and compared with the predetermined distance to determine whether the vehicle has deviated from the set route (step S6). If the vehicle has deviated from the set route, the re-search means executes a re-search for a new route (step S10). If the vehicle has not deviated from the set route, the output means displays and/or vocally outputs navigation guidance in accordance with a signal output from the route guidance control means on the basis of the same route (step S7), and MODE=0 is set (step S8). Then, the distance from the current position to the destination is calculated, and the arrival at the destination is determined depending on whether the calculated distance has become a predetermined value (step S9) or less. If the calculated distance is the predetermined value or less, it is determined that the vehicle has arrived at the destination, and the route guidance ends. Conversely, if the distance from the current position to the destination is more than the predetermined value, the operation returns to step S5 to continue detecting the current position of the vehicle.

Although the above-described operation automatically detects deviation from route and re-searches for a new route, the system may be designed to display, for example, "RE-SEARCH" key, so as to allow a driver to instruct to start the re-search when detecting deviation from route. The thus-designed system operates as illustrated in FIG. 4. In operation, the setting of a predetermined distance is omitted from step S14, and it is determined in step S16 whether a re-search request is input through the input device. If a re-search request has been input, step S20 executes the re-search operation. Further, the system may be designed to enable the search for a route that is much different from the previously set route, in accordance with the driver's instructions made during travel along the previously set route. For example, the data regarding roads, branch or turning points, etc. may be weighted based on various types of information such as road width, type of road, e.g. superhighway, national road, state or municipal road, etc., intersection traffic light waiting time, road restrictions such as one-way street or no-entry, or degrees of traffic congestion, and so on. If such data is adjusted so that the weighted value ("cost") of the previously set guiding route becomes high, the lowest value route found by re-search will be different from the previously set route.

The off-route operation of step 10 shown in FIG. 3 will be described in detail with reference to FIGS. 5 and 6 which illustrate examples of the off-route operation and FIGS. 7 and 8 which illustrate examples of the operation of setting a re-search starting location. This embodiment of the invention uses for the route search the stored information including data on intersections and roads arranged in the form of road segments including segments between intersections and, if necessary, other characteristic objects such as railroad crossings, and connection information for roads connected to such roads or intersections. The search can be started at any given location on a road.

The off-route operation first determines whether the current vehicle position is on a "guidance possible road" (step S21). If the current position is not on a "guidance possible road", MODE=1 is set (step S27) and the operation ends. If the current position is on a "guidance possible road", the routine checks whether MODE is one of 0 and 1 (step S22). If MODE is neither 0 nor 1, which means that the vehicle is traveling on a "guidance possible road" which is not part of the set route, the routine then determines whether MODE=2 has been set and the predetermined distance has been traveled (step S28). If step 22 makes a negative determination but step S28 makes an affirmative determination, meaning that upon completion of the search the vehicle has traveled the predetermined distance on a "guidance possible road" off the set route, or if step 22 makes an affirmative determination, meaning either that the vehicle has left the set route but is on a "guidance possible road" or that the vehicle deviated from the set route, travelled a road other than a "guidance possible road" and then come onto a "guidance possible road", a re-search starting location is set (step S23). After a re-search is executed (step S24), either MODE=2 and a predetermined distance (step S26) or MODE=3 (step S29) is set in accordance with the determination as to whether a new route has been found (step S25).

Figure 5:
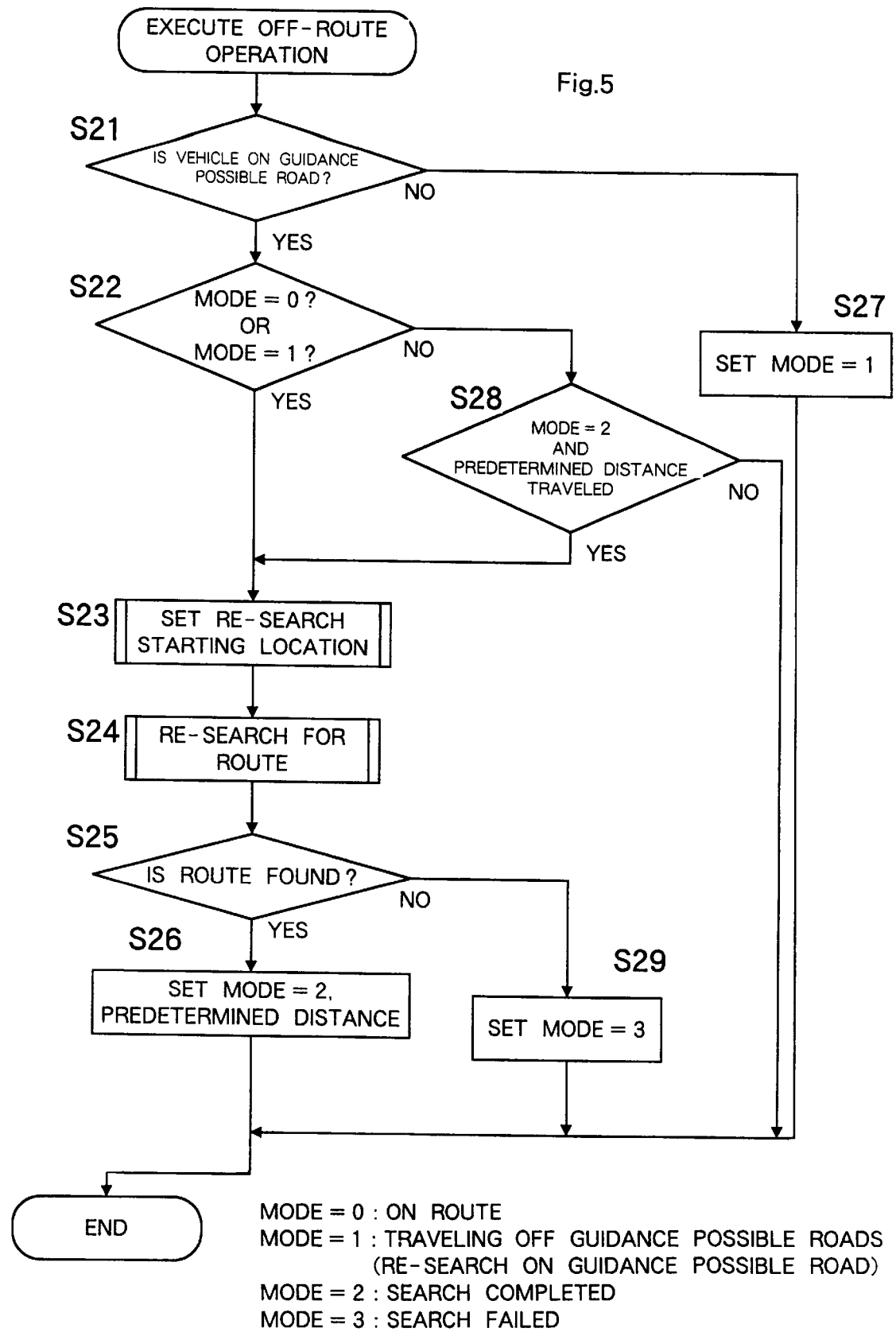
FIG. 5 is a flow chart of another example of a routine for off-route operation.
Figure 6:
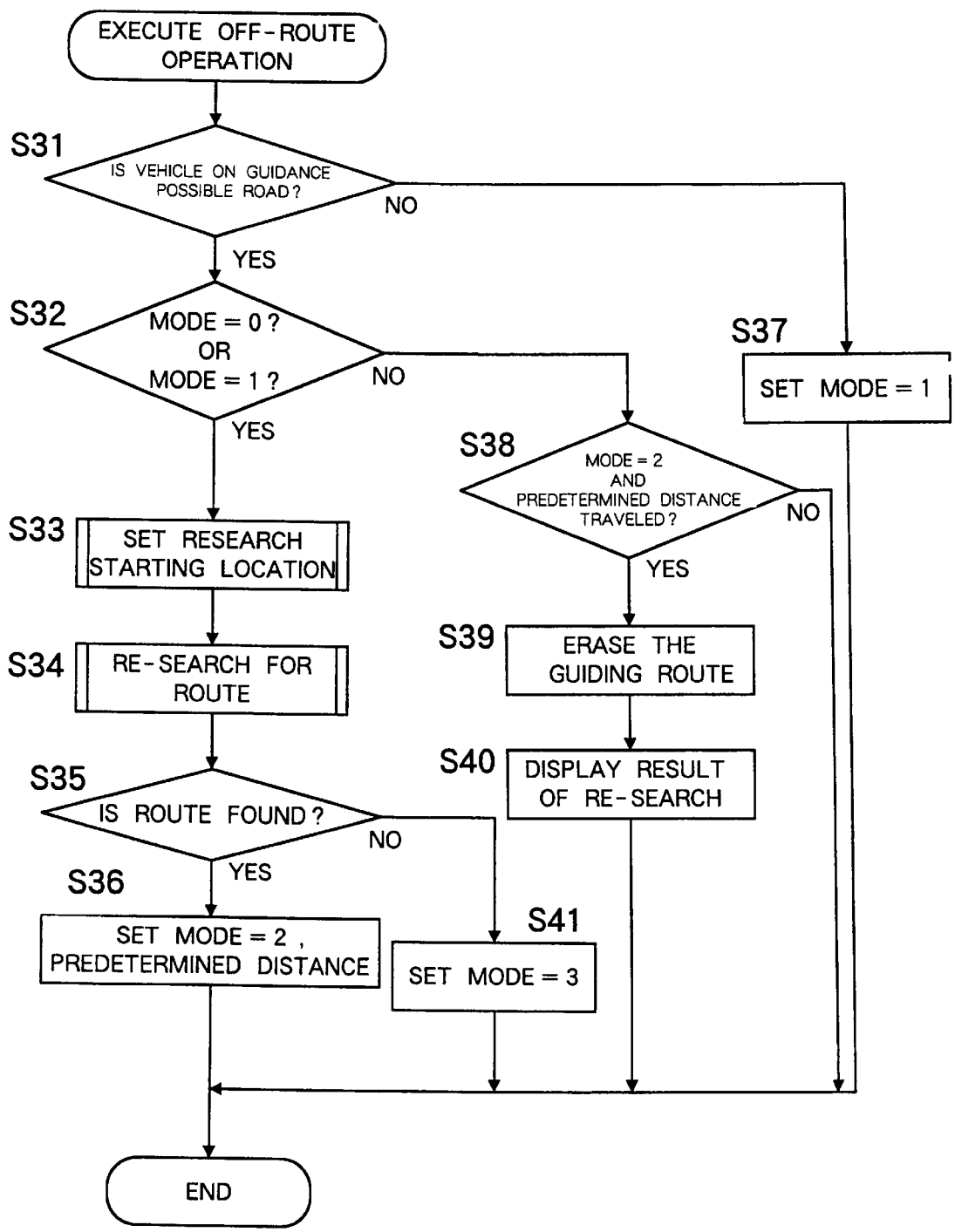
FIG. 6 is a flow chart of another example of a routine for off-route operation.
Figure 7:
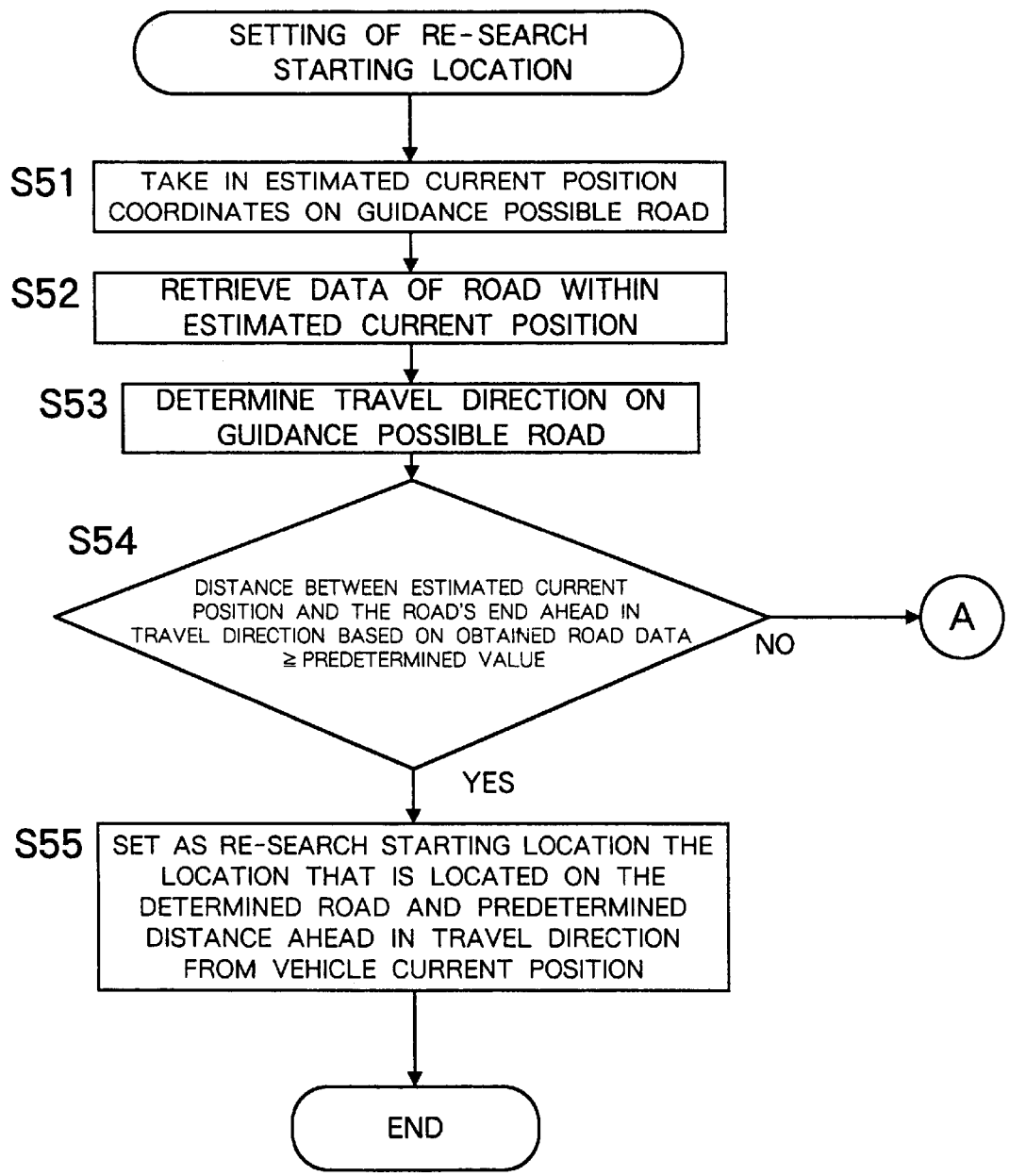
FIG. 7 is a flow chart of a routine for setting a re-search starting location.

Alternatively, if following the completion of a search the vehicle has traveled at least the predetermined distance on a "guidance possible road" but off the set route, so that step S28 makes an affirmative determination, the routine processing as illustrated in FIG. 6 may be executed instead of that shown in FIG. 5. That is, the previously set route is erased (step S39) and the result of re-search is displayed (step S40).

The setting of a re-search starting location in step S23 in FIG. 5 and step S33 in FIG. 6 sets, as a re-search starting location, a location that is located on the road a predetermined distance ahead of the current position, in response to a request to start re-search. If the point the predetermined distance ahead of the current position does not exist on the currently traveling road, a road connecting to the current road is searched for. More specifically, as illustrated in FIG. 7, after estimated current position coordinates on the "guidance possible road" are obtained (step S51), data is retrieved for the road on which the estimated current position is located (step S52). Then, current position of the vehicle and its travel direction are determined to compute the travel direction through the "guidance possible road" (step S53). After that, it is determined whether the distance between the estimated current position and the end point of the road located ahead in the direction of travel, based on the retrieved road data, is at least a predetermined value (step S54). If the distance equals or exceeds the predetermined value, the location that is located on the determined road and located a predetermined distance ahead in the direction of travel from the current vehicle position is set as a re-search starting location (step S55). Conversely, if step S54 determines that the distance is less than the predetermined value, data for a plurality of roads connecting to the current road are retrieved and an appropriate road is selected therefrom. This routine is illustrated in FIGS. 8 and 9, and will be described below.

Figure 8:
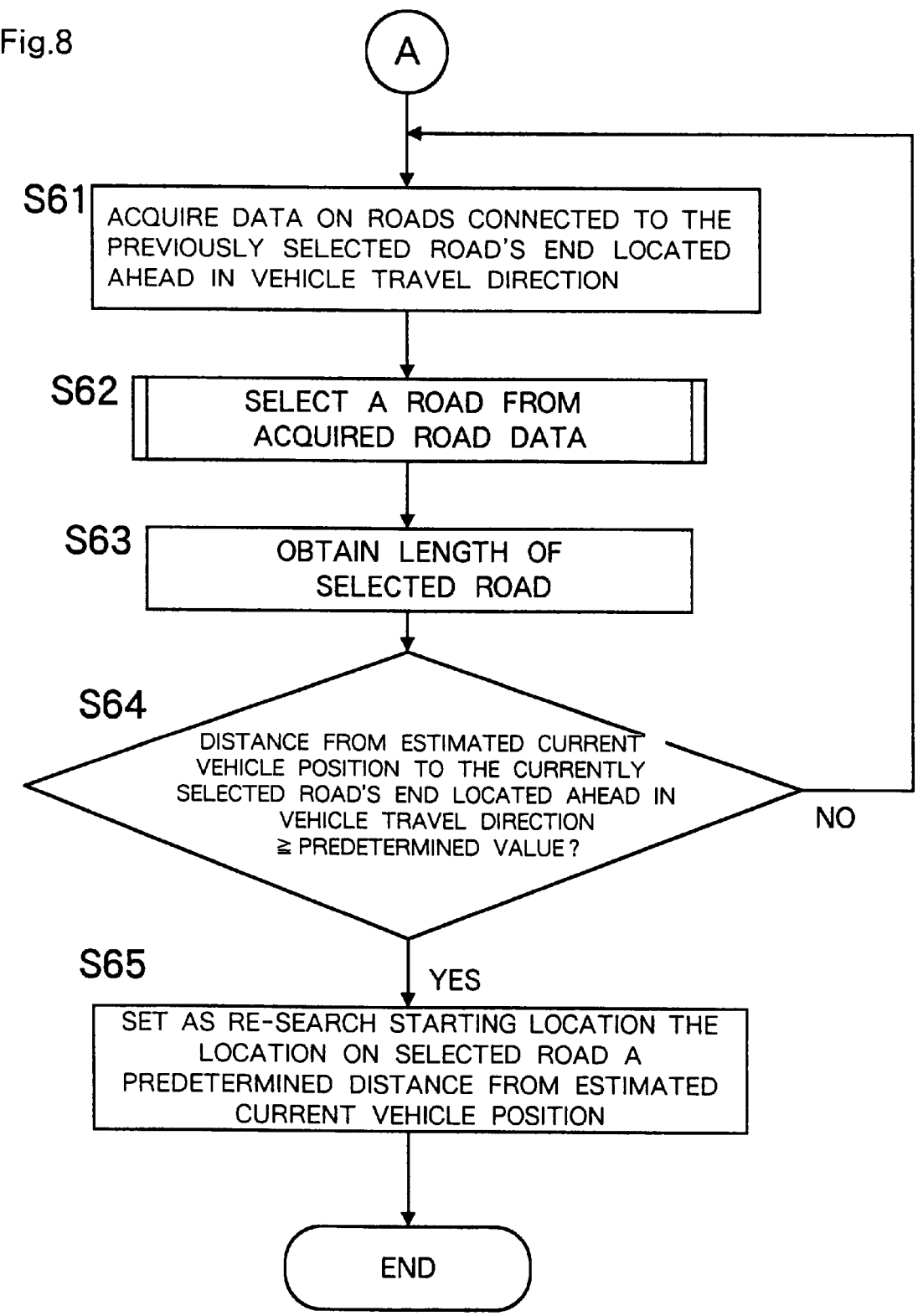
FIG. 8 is a continuation of the flow chart of FIG. 7.

In the example illustrated in FIG. 8, data for roads connecting to the end of the previously selected road, the end being ahead in the direction of travel from the current vehicle position, are acquired (step S61). The data for a single road is selected from the acquired road data (step S62). Then, the length of the selected road is read in (step S63). It is then determined whether the distance between the estimated current vehicle position and the currently selected road's end located ahead, in the direction of vehicle travel equals or exceeds a predetermined value (step S64). The routine up to step S61 is repeated until the distance is found to be the predetermined value or greater. When the distance is found to be at least the predetermined value, the location on the selected road located a predetermined distance from the estimated current vehicle position is set as a re-search starting location (step S65). Thus, the weighing of data for "cost" included within the retrieved road data is used to select a road. That is, the road having the least "cost" is selected. As used herein, "cost" represents independent values for each road data, such as road length, road type or road width, and the relative road data, such as connections of roads (turning right or left is a high cost). This embodiment thus selects an optimal route segment to provide an easy-to-drive road that connects to the re-search starting location, thus producing a suitable re-search result.

Figure 9:
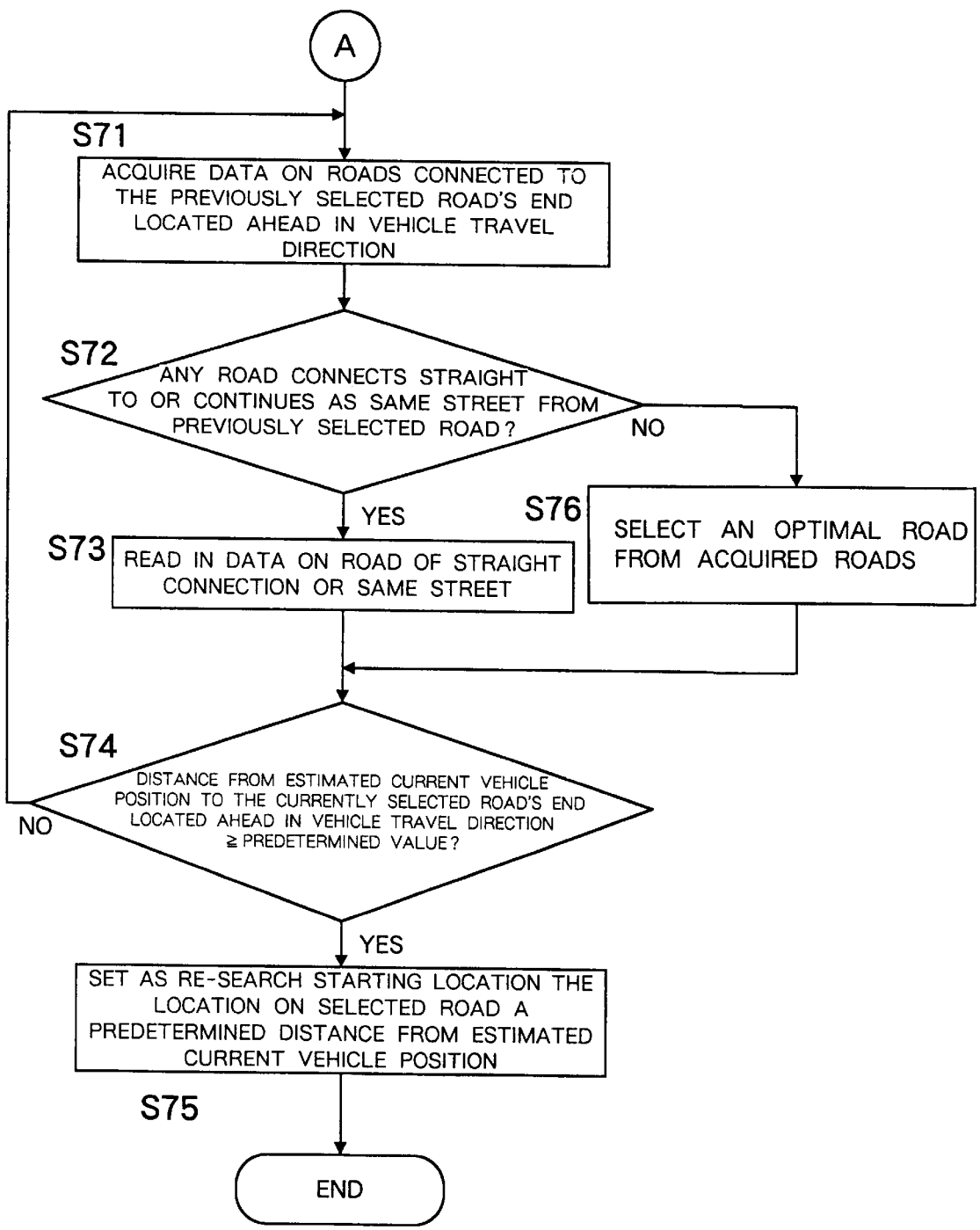
FIG. 9 is a flow chart of another example of a routine for setting a re-search starting location.

In the example shown in FIG. 9, the data for roads connected to the previously selected road's end, located ahead in the direction of vehicle travel is acquired (step S71), and the acquired road data is checked to determine if it includes a road connected straight to the previously selected road or continuing as the same street from the road (step S72). The straight connection or the same street continuation is determined on the basis of the angle between the entry and exit roads connected at an intersection computed from the road data. If any of the retrieved roads is a straight connection or a same street continuation, the data for that road is retained (step S73). If there is no such road, an optimal road is selected from the retrieved roads (step S76). Then, it is determined whether the distance between the estimated current vehicle position and the currently obtained road's end located ahead in the direction of vehicle travel is at least a predetermined value (step S74). If it is less than the predetermined value, the operation returns to step S71 to repeat the same processing. If the distance is at least the predetermined value, the location on the obtained road located a predetermined distance from the estimated vehicle current position is set as a re-search starting location (step S75). Thus, the road having the smallest connecting angle is selected after computation of the angle between each connecting road and the current road. More specifically, this operation sets a re-search starting location with priority given to a straight drive, so as to avoid a turn to the extent possible prior to arrival at the re-search starting location, since the driver tends to drive straight through intersections during the time awaiting the result of a search to be displayed with start of guidance along the newly found route, in other words, during that period of time when no guidance route has been set.

The above-described operation is substantially equivalent to performance of a search of a partial route to a search starting location point, that is, determination of a route to the search starting location, although the route is not displayed. Therefore, the apparatus may provide simple guidance on a display or by voice, for example, "Follow the street.", "Go straight on.", or "Ahead, turn right." if a turn right (or left) is required. Furthermore, while the above operation selects a single road connected to the current road, it is also permissible to set points on all the roads connected to the current road, each point located a predetermined distance from the current position, and compare the "costs" from the current position to the set points in order to select the road having the least "cost", as previously defined.

Figure 11A:
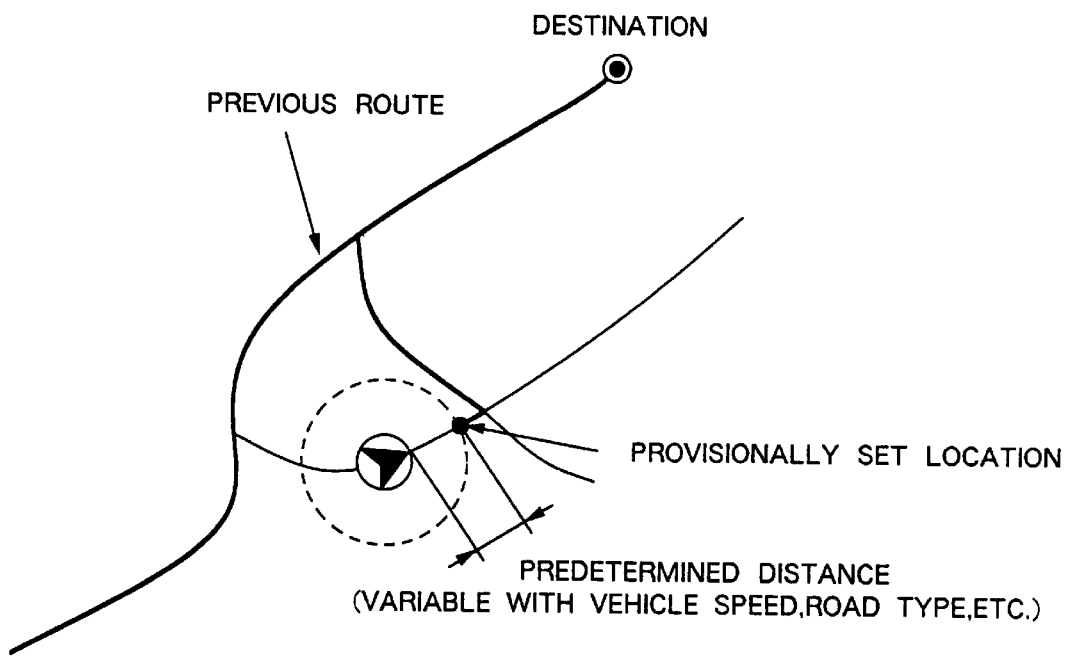
FIGS. 11A and 11B illustrate examples of a new route found by a re-search executed by the off-route routine.
Figure 11B:
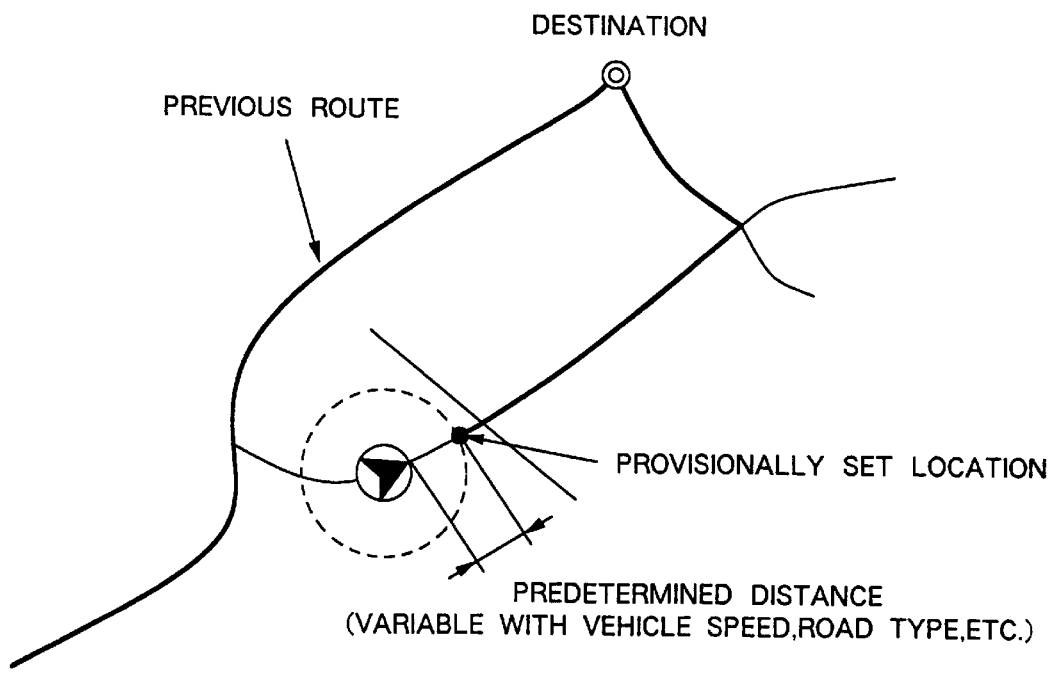

The above-mentioned predetermined distance may be fixed or variable. If it is variable, the setting of a predetermined distance is inserted into the procedure for setting a re-search starting location, for example, immediately before step 51 in the routine illustrated in FIG. 7. In the inserted step, the current vehicle speed is detected by the vehicle speed sensor 27, and a predetermined distance is set corresponding to the detected vehicle speed with reference to the table as shown in FIG. 10. Since a greater vehicle speed results in an earlier arrival at a re-search starting location if the predetermined distance is fixed, the predetermined distance is variably set to increase the time required to get to the re-search starting location. Similarly, the predetermined distance may be set in accordance with the detected type of the currently travelled road, with reference to the table shown in FIG. 10. Furthermore, the predetermined distance may vary depending on the search method, that is, a "surrounding search" as illustrated in FIG. 11A (wherein re-search is performed with priority given to returning to the previously set route) or an entire route search as illustrated in FIG. 11B (where an initial search is performed again to find a new route from the re-search starting position to the destination). The "surrounding search" requires less search time than the entire route search and, therefore, permits the setting of a closer re-search starting location.

Although the above-described embodiment sets a starting point for a re-search of a route and determines a route starting at that point, the display and guidance may be performed in such a manner that the route from the starting point to the destination is displayed and the guidance is started at the starting point or in such a manner that the route from the current position, assumed at the time of the completion of extraction of a route in the re-search operation, to the starting point of the route is connected to the route from the starting point to the destination on the display and guidance is performed based on the combined route. In addition, although the foregoing embodiment determines the starting point with reference to a point at which the re-search request is input, such a reference point may instead be a current position taken at the time of setting a route after the data regarding the re-search has been read. Further, such a reference point may also be a point at which the display control is started after the route has been set.

Figure 12:
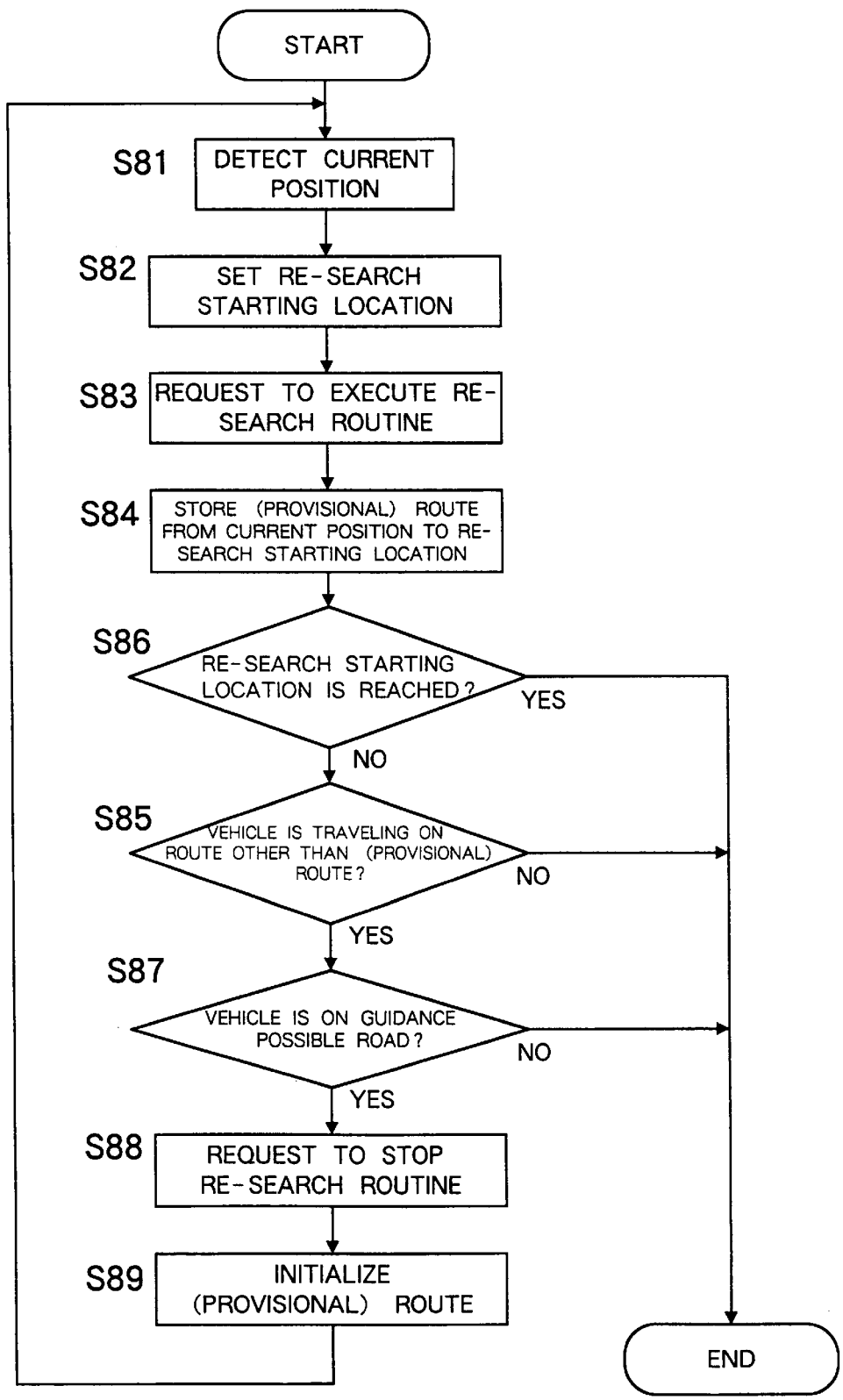
FIG. 12 is a flow chart of a routine performed when the vehicle has turned right or left before reaching the starting point for a newly set route.

FIG. 12 illustrates an example of a routine for turning right or left prior to reaching the starting point. Referring to FIG. 12, the current position is determined by the current position detecting means (step S81). After the re-search starting location is set (step S82), a request to execute the re-search routine is issued (step S83). Then, a provisional route from the current position to the re-search starting location is stored (step S84), and it is then determined whether the re-search starting location has been reached (step S85). If the re-search starting location has not been reached, it is then determined whether the vehicle is traveling on a route other than the provisional route (step S86). If the vehicle is traveling on a route other than the provisional route, it is then determined whether the vehicle is on a "guidance possible road" (step S87). If it is on a "guidance possible road", a request to stop the re-search routine is issued (step S88), and the provisional route is initialized or cleared (step S89), and then the operation returns to step S81 to repeat substantially the same processing. On the other hand, if step S85 determines that the re-search starting point has been reached, or if step 86 determines that the vehicle is not traveling on a route other than the provisional route, after determination that the re-search starting point has not been reached, or if it is determined that the vehicle is not on a "guidance possible road" while the vehicle is on an other route, the operation ends.

With the routine described above, a predetermined distance ahead in the direction of vehicle travel direction from a current position, is set in accordance with the vehicle speed and the road type, and the location at the predetermined distance ahead is determined as a provisionally set location for performing a re-search. Thus, the embodiment prevents an incident where the vehicle passes by the route found by the re-search and is thereby able to perform guidance along the found route that starts ahead.

Figure 13:
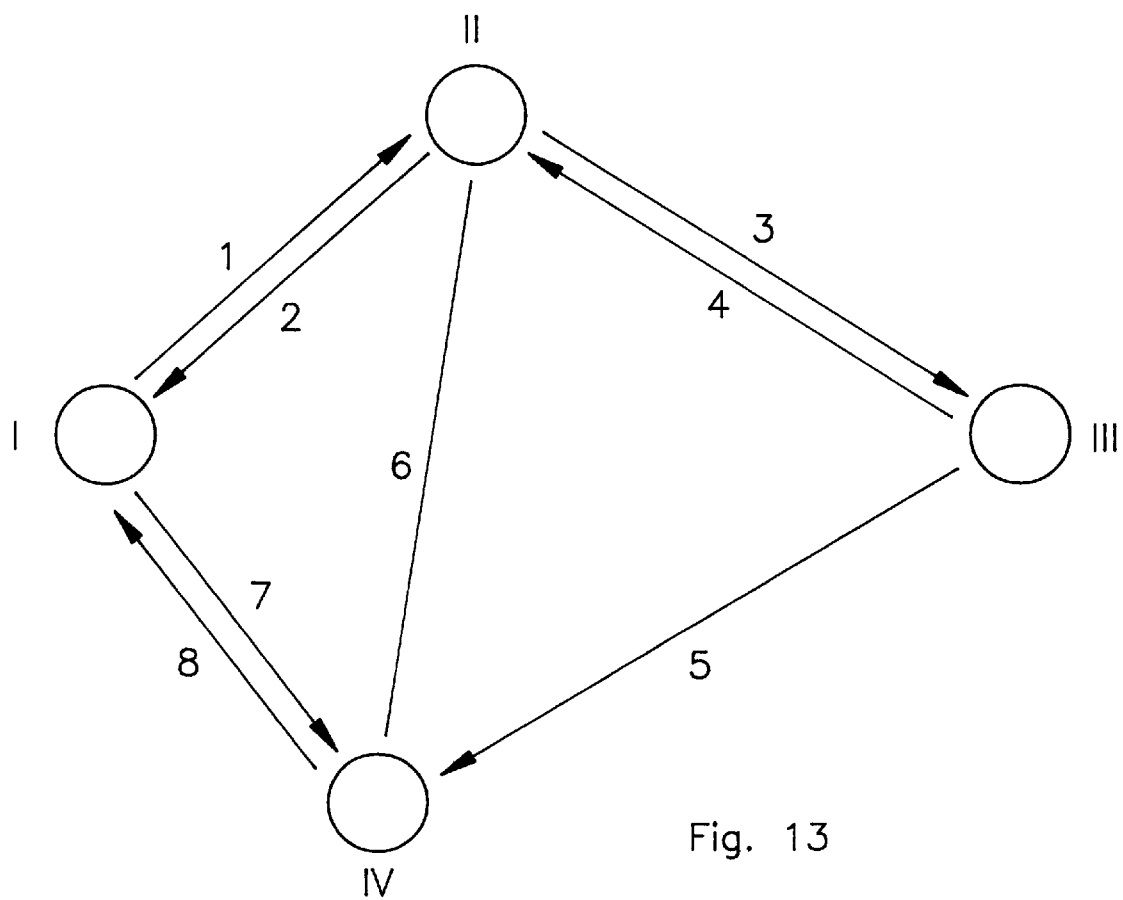
FIG. 13 illustrates an example of a road network and road data structure for that road network.

The setting of a search starting location will now be described with reference to FIG. 13 which illustrates an example of the arrangement of data for road networks and roads. When detecting a current vehicle traveling direction and setting as a search starting location the location on a road located a predetermined distance ahead of the current position on the currently travelled road, the currently travelled road and the traveling direction along the road are determined on the basis of the current vehicle traveling direction detected by the current position detecting device and the road data stored in the information storing device. It is assumed herein that the road data stored in the information storing device is stored separately for the different permitted traffic directions along each road connecting two intersections, as indicated in FIG. 13. For example, since the road connecting the intersections I and II is a two-way street, data 1 and data 2 for the opposite directions on the road are separately stored. Since the road between the intersections III and IV is a one-way street, allowing traffic only from the intersection III to the intersection IV, only data 5 is stored for that road. Each group of road data stored separately for a given traffic direction includes various data for the route search, such as information about roads connected to that road (permission or prohibition of entry thereinto), the road width, the number of lanes, the road length, or the costs of the connecting roads.

The data for the road and traffic direction the vehicle is traveling is selected in accordance with the road data and the current vehicle travel direction detected by the current position detecting device. More specifically, a road (for example, one of routes 1 and 2, in FIG. 13) is first specified as the currently travelled road based on the current vehicle position, and then the currently travelled road and the travel direction on the road are determined on the basis of an angular difference between the direction of the specified road and the vehicle travel direction. Alternatively, the traveling direction on a road may be determined by computing the direction of entry onto the road that is assumed to be the traveling road with reference to a record of previous travel. In addition, it may also be determined from only the detected direction of vehicle travel.

The present invention is not limited to the above-disclosed embodiments, and may be modified in various manners. For example, although the above embodiment performs a re-search automatically or by a key input when deviation from route is detected, it should be apparent that this invention is applicable to initial searches in substantially the same manner as to re-searches. It should also be understood that re-searches include various search methods proposed by the present applicant, such as a "surrounding search" that searches for a route to return to the previously set route and connects the found route to the previously set route, an entire route search that searches for a new route to the destination or intermediate point, or a second route search that searches for a new route based on the previously set route, etc.

Furthermore, although the foregoing embodiments have been described as including an information storing device and a central processing unit which are installed in a vehicle, the apparatus of the invention may be constructed such that the information storing device storing data needed for route search and route guidance, for example, map data, and the central processing unit for performing a route search are installed in an information center or like facility remote from the vehicle, with a transmitter-receiver provided in the vehicle for accessing the center. For example, the destination or intermediate point input by a user, and other data, such as search conditions, are transmitted from the vehicle to the information center, and the information center provides route guidance based on the data received. Since the information center can add various traffic information, such as street congestion or restrictions, to perform route searching, the search of a route can be suitably performed by taking into account such traffic information and, further, the information storing unit and the central processing unit on the vehicle can be simplified.

The present invention is intended to cover various modifications and equivalent arrangements included within the spirit and scope of the appended claims. The scope of the following claims is to be accorded the broadest interpretation so as to encompass all such modifications and equivalent structures and functions.

What is claimed:

1. A vehicular navigation apparatus for guidance of a vehicle along a preset route, comprising:

current position detecting means for detecting a current position of a vehicle, a distance travelled and a direction of travel of the vehicle;

information storing means for storing map information including road data and other route information for route search and route guidance;

input means for inputting at least one of a destination and an intermediate point and for inputting an instruction to search for a route to at least one of the destination and the intermediate point on the basis of the current position detected by the current position detecting means;

output means for outputting information for route guidance; and a central processing unit including:

route searching means for determining, as a route search starting location, a location on a road for which road data is stored in the information storing means and which is located a predetermined distance ahead in the direction of travel, and for searching for an optimum route from the route search starting location to said at least one of the destination and the intermediate point on the basis of the map information, said route searching means, if the vehicle is not traveling on a road for which road data available for searching is stored in said information storing means, waiting until the vehicle enters onto a road for which road data available for searching is stored in said information storing means, and then searching for a new route, route storing means for temporarily storing data for the optimum route found by the route searching means as a set route, and route guidance control means for outputting to the output means a signal for executing route guidance based on the set route.

2. A vehicular navigation apparatus according to claim 1, wherein road data stored in said information storing means includes road data available for searching and road data flagged as unavailable for searching.

3. A vehicular navigation apparatus for guidance of a vehicle along a set route, comprising:

current position detecting means for detecting a current position of a vehicle, a distance travelled and a direction of travel of the vehicle;

information storing means for storing map information including road data in the form of road segments between intersections, connection information for the road segments connected to the intersections, and other route information for route search and route guidance;

input means for inputting at least one of a destination and an intermediate point;

output means for outputting information for route guidance; and a central processing unit including:

preset route searching means for searching for a set route to at least one of the destination and the intermediate point;

new route searching means, operable when the current position detected by the current position detecting means is found on a road deviating from the set route, for obtaining road data for the road segment which includes the detected current position, for deciding whether the obtained road segment includes a location which is a predetermined distance ahead in the direction of travel, for either (a) selecting a route search starting location on the obtained road segment if it was decided that the obtained road segment includes the location a predetermined distance ahead or (b) selecting a route search starting location on an optimal road selected from road segments connected to the obtained road segment if it was decided that the obtained road segment does not include the location a predetermined distance ahead, and for searching for an optimum route from the route search starting location to said at least one of the destination and the intermediate point on the basis of the map information, route storing means for temporarily storing data for the optimum route found by the new route searching means as the set route, and route guidance control means for outputting to the output means a signal for executing route guidance based on the set route.

4. A vehicular navigation apparatus according to claim 3 wherein said new route searching means searches for a route in response to manual input of an instruction through the input means.

5. A vehicular navigation apparatus according to claim 3 wherein said new route searching means searches for a route automatically in response to a determination of a deviation from the set route.

6. A vehicular navigation apparatus according to claim 5 wherein the determination of a deviation from the set route requires determining vehicle travel through a predetermined distance off the set route.

7. A vehicular navigation apparatus according to claim 4 wherein the route guidance control means executes a predetermined navigation guidance while the new route searching means executes a search until the search is completed.

8. A vehicular navigation apparatus according to claim 5 wherein the route guidance control means executes a predetermined navigation guidance while the new route searching means executes a search until the search is completed.

9. A vehicular navigation apparatus according to claim 3 wherein the new route searching means in deciding whether the obtained road segment includes a location which is a predetermined distance ahead in the direction of travel compares the predetermined distance with a distance to an end of the located road segment.

10. A vehicular navigation apparatus according to claim 3 wherein said new route searching means in selecting a route search starting location on an optimal road selected from road segments connected to the obtained road segment if it was decided that the obtained road segment does not include the location a predetermined distance ahead selects the optimal road based upon the least cost road of the road segments connected to the obtained road.

11. A vehicular navigation apparatus according to claim 3 wherein said new route searching means in selecting a route search starting location on an optimal road selected from road segments connected to the obtained road segment if it was decided that the obtained road segment does not include the location a predetermined distance ahead selects the selects the optimal road based upon the least turning angle from the obtained road.

* * * * *

UNITED STATES PATENT AND TRADEMARK OFFICE
CERTIFICATE OF CORRECTION

PATENT NO. : 5,926,118
DATED : July 20, 1999
INVENTOR(S) : HAYASHIDA et al

It is certified that error appears in the above-identified patent and that said Letters Patent is hereby corrected as shown below:

Col. 14, line 17, "segment" should read "segment,".
Col. 14, line 19, "ahead" should read "ahead,".
Col. 14, line 20, delete "selects the".

Signed and Sealed this

Sixth Day of March, 2001

Attest:

NICHOLAS P. GODICI

Attesting Officer     Acting Director of the United States Patent and Trademark Office